(12) United States Patent
Neumann et al.

(10) Patent No.: US 12,480,542 B2
(45) Date of Patent: Nov. 25, 2025

(54) SNAP-ACTION CAGE FOR A TAPERED ROLLER BEARING, AND TAPERED ROLLER BEARING WITH THE SNAP-ACTION CAGE

(71) Applicant: Schaeffler Technologies AG & Co. KG, Herzogenaurach (DE)

(72) Inventors: Michael Neumann, Schweinfurt (DE); Thomas Stahl, Poppenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/580,252

(22) PCT Filed: Jul. 19, 2022

(86) PCT No.: PCT/DE2022/100526
§ 371 (c)(1),
(2) Date: Jan. 18, 2024

(87) PCT Pub. No.: WO2023/011684
PCT Pub. Date: Feb. 9, 2023

(65) Prior Publication Data
US 2024/0318685 A1   Sep. 26, 2024

(30) Foreign Application Priority Data

Aug. 3, 2021 (DE) .......................... 102021120103.9

(51) Int. Cl.
*F16C 19/36* (2006.01)
*F16C 33/36* (2006.01)
(Continued)

(52) U.S. Cl.
CPC ........ *F16C 19/364* (2013.01); *F16C 33/4652* (2013.01); *F16C 33/4676* (2013.01); *F16C 33/585* (2013.01); *F16C 2226/74* (2013.01)

(58) Field of Classification Search
CPC .. F16C 19/364; F16C 33/366; F16C 33/4641; F16C 33/4652; F16C 33/4676; F16C 33/585; F16C 2226/74
See application file for complete search history.

(56) References Cited

U.S. PATENT DOCUMENTS

| | | | | |
|---|---|---|---|---|
| 4,387,939 A | * | 6/1983 | Walter | ................ F16C 33/4641 384/578 |
| 9,512,880 B2 | * | 12/2016 | Yasuda | ................ F16C 33/3875 |

FOREIGN PATENT DOCUMENTS

| | | | | |
|---|---|---|---|---|
| DE | 102006013430 A1 | | 9/2007 | |
| DE | 102014201718 A1 | * | 8/2015 | .............. F16C 19/26 |

(Continued)

*Primary Examiner* — Phillip A Johnson
(74) *Attorney, Agent, or Firm* — Volpe Koenig (57) ABSTRACT

A snap-action cage for a tapered roller bearing is configured as a window cage with a plurality of windows for receiving tapered rollers, with a first cage portion having a plurality of first web portions. The first web portions in each case define run-on surfaces for the tapered rollers. A second cage portion has a plurality of second web portions that are connectable and/or are connected to the first web portions via a snap-action connection, in order to form in each case one web. The second web portions are configured spaced apart in the circulating direction from and/or without contact with the run-on surfaces. The hook receptacle has a fork hook with a hook groove which is configured in between, and the snap-action hook snaps into the fork hook, and a guide portion is held in the hook groove in a positively locking manner in the circulating direction.

16 Claims, 8 Drawing Sheets

(51) Int. Cl.
*F16C 33/46* (2006.01)
*F16C 33/58* (2006.01)

(56) References Cited

FOREIGN PATENT DOCUMENTS

| | | |
|---|---|---|
| DE | 102017116606 A1 | 1/2019 |
| DE | 102018127781 A1 | 5/2020 |
| JP | 59155622 A * | 9/1984 |
| JP | 2014185729 A | 10/2014 |
| WO | WO-2021069008 A1 * | 4/2021 |

* cited by examiner

SNAP-ACTION CAGE FOR A TAPERED ROLLER BEARING, AND TAPERED ROLLER BEARING WITH THE SNAP-ACTION CAGE

CROSS-REFERENCE TO RELATED APPLICATIONS

This application is the U.S. National Phase of PCT Appln. No. PCT/DE2022/100526, filed Jul. 19, 2022, which claims priority to German Patent Application No. 10 2021 120 103.9, filed Aug. 3, 2021, the entire disclosures of which are incorporated by reference herein.

TECHNICAL FIELD

The disclosure relates to a snap-action cage for a tapered roller bearing. The disclosure also relates to a tapered roller bearing with this snap-action cage.

BACKGROUND

Tapered roller bearings permit radial forces to be transmitted in both directions and axial forces to be transmitted at least or precisely in one axial direction. Tapered rollers are situated as rolling bodies in tapered roller bearings, wherein they are usually arranged with their rotational axes set at an angle with respect to a main rotational axis of the tapered roller bearing. In this context, the tapered rollers are usually arranged in such a way that the smaller roller end face runs on a smaller pitch circle diameter than the large roller end face. Tapered roller bearings require cages to guide the tapered rollers. The construction and the positioning of said cages is difficult, however, on account of the geometric conditions in the tapered roller bearing.

For example, the publication DE 10 2018 127 781 A1, which forms the closest prior art, discloses a rolling bearing cage with two plastic cage rings connected to one another by snap-action connections, wherein separate connecting arrangements, also made of plastic, are provided to form the snap-action connections. In one embodiment for tapered roller bearings, a cage is formed by two side parts and a plurality of webs, wherein the webs are configured as separate components.

SUMMARY

It is an object of the present disclosure to propose a cage for a tapered roller bearing which is designed with ease of assembly in mind. This object is achieved by a snap-action cage having one or more of the features disclosed herein and by a tapered roller bearing having one or more of these features. Preferred or advantageous embodiments result from the claims, the following description, and the attached figures.

The subject matter of the disclosure is a snap-action cage which is suitable and/or configured for a tapered roller bearing. The snap-action cage is particularly preferably made of plastic. The snap-action cage is constructed as a window cage, wherein it has a plurality of windows for receiving tapered rollers. In particular, the windows are dimensioned to match the shape of the tapered rollers. The windows are separated from one another by webs. The tapered rollers preferably have a small roller end face and a large roller end face. The small roller end face has a smaller diameter than the large roller end face. The snap-action cage is configured in particular to be frustoconical in shape, wherein the diameter on one axial side is smaller than on the other axial side.

The snap-action cage has a first cage portion, wherein the first cage portion has a plurality of first web portions. It is intended that, in the installed state, the first web portions extend between the tapered rollers and form at least a partial portion of the webs. The first web portions in each case define run-on surfaces for the tapered rollers. The defined run-on surfaces for the tapered rollers should be understood as the run-on surfaces that are actually present in the first web portions and are extrapolated over the entire tapered roller length from the actually present run-on surfaces.

The snap-action cage has a second cage portion, wherein the second cage portion has a plurality of second web portions. In particular, there is an equal number of first web portions and second web portions. The second web portions form in each case one part of the web and extend between the tapered rollers in the installed state. The second web portions can be connected to the first web portions via a snap-action connection, wherein a first and a second web portion together form one of the webs. In particular, all webs are of identical design in the circulating direction. The first cage portion and/or the second cage portion is/are configured in particular in one piece and/or of one material. In particular, the respective cage portion is formed from a continuous portion of material. In particular, the snap-action cage has a two-piece design.

According to the disclosure, it is proposed that the second web portions are formed spaced apart in the circulating direction from and/or without contact with the run-on surfaces. This means that, in the installed state, the second web portions do not contact the tapered rollers in the circulating direction. The hook receptacle has a fork hook with a hook groove arranged in between, wherein the hook groove runs in the axial direction and/or the fork hook is aligned in the circulating direction. The snap-action hook snaps into the fork hook upon displacement in the axial direction. The snap-action hook further has a guide portion, wherein the guide portion is axially displaceable in the hook groove, but is held in a positively locking manner in the circulating direction. The positively locking manner in which it is held in the circulating direction secures against rotation.

In this regard, it is a consideration of the disclosure that the first cage portions assume a guiding function for the tapered rollers. The second web portions, on the other hand, only perform a connecting function for the snap-action cage and are therefore arranged in the circulating direction without contact with/spaced apart from the run-on surfaces and/or tapered rollers. By splitting these functions in this manner, the second web portions can be designed to be narrower in the circulating direction, so that the second web portions can be passed through the region of the large roller end faces between the tapered rollers ready for assembly.

In fact, only the installation space provided by the tapered rollers in the region of the large roller end face between the tapered rollers is utilized. On the other hand, it is possible to form the first web portions in any shape, because these are inserted from the side of the small roller end face where more installation space is available. Due to the connecting region between the first cage portion and the second cage portion being arranged in the rolling body chamber itself, the snap-action cage, in particular the webs, is/are provided with a high degree of stability. In particular, the tapered rollers are only guided through the first web portions over a certain length range, preferably less than 80%, in particular less than 70% and specifically less than 60% of the total length of the tapered rollers.

In this regard, it is a further consideration of the disclosure that comb-shaped cages are not ideal for cages for tapered roller bearings in particular, which have to provide high rotational speeds, as the webs between the tapered rollers have to absorb different mechanical loads along the tapered rollers and can dissipate them differently on account of the geometric design. This always results in a more yielding region in the region of the large roller end face in relation to the webs, which can lead to instability at higher speeds. Other mountable cages have too many individual components or also create regions with different load capacities along the webs.

With the disclosure, it is achieved that the connecting region is arranged in the rolling body chamber despite having only two components and thus exhibiting an assembly-friendly design, so that the mechanical stability and thus the functional properties of the snap-action cage are also improved.

In a preferred embodiment, the second web portions are configured without undercuts in relation to the run-on surfaces. This aspect once again emphasizes the idea that the second web portions should be designed to be ready for assembly and must therefore be formed without contact with and/or spaced apart from the run-on surfaces.

In a preferred further development according to the disclosure, the first and/or the second web portions extend in the axial direction, in particular exactly in the axial direction. This embodiment means that the run-on surfaces on the first web portions do not run parallel to the roller rotational axis, but instead run at an angle to the roller rotational axis. If the roller rotational axes of the tapered rollers jointly define a taper, the webs and/or the first web portions and/or the second web portions jointly define a hollow cylinder. Due to the formation as a hollow cylinder, the web portions can be inserted into one another particularly easily and therefore be easily assembled.

In a preferred further development according to the disclosure, the first web portions have a first contact surface for run-on in a radial inward direction against an inner ring of the tapered roller bearing and/or the second web portions have a second contact surface for run-on in a radial outward direction against an outer ring of the tapered roller bearing. In particular, the first contact surfaces are arranged on a notional first tapered surface, wherein the first tapered surface has the same main axis and the same taper angle as the tapered surface of the inner raceway and/or the second contact surfaces are arranged on a second tapered surface, wherein the second tapered surface has the same main axis and the same taper angle as the tapered surface of the outer raceway. The contact surfaces reduce the possible deflection of the first and/or second web portions in the region of the contact surfaces, as these run against the respective raceway if the deflection is too great and are thus mechanically limited.

It is preferred that the first web portions receive the second web portions symmetrically in the circulating direction. This embodiment ensures that the tapered roller bearing is equally stable in both directions of rotation.

It is particularly preferred that the snap-action connection, which already forms a positively locking connection of the cage portions in the axial direction, also forms a positively locking connection in the circulating direction, so that the first cage portion and the second cage portion are secured against rotation relative to one another. This embodiment further improves the stability and functionality of the snap-action cage.

In a preferred embodiment, the snap-action connection has a snap-action hook on one cage portion, preferably on the second cage portion and/or on the second web portions, and a hook receptacle on the other cage portion, in particular on the first cage portion and/or on the first web portions.

In a preferred constructive implementation, the first cage portion has a first side ring and the second cage portion has a second side ring. The side rings are connected to one another via the webs. The rigidity of the web portions is designed to be similar, for example in that the first and second web portions and/or the two side rings in each case have a cross-sectional area of the same size. This embodiment emphasizes once again that the snap-action cage has the same functional properties even at higher speeds on the small roller end face and on the large roller end face.

It is particularly preferred that the snap-action connection, as viewed in the axial direction, is arranged in a central region between the cage portions and/or is arranged between the two side rings. For example, the snap-action connection is arranged in a range between 40% and 80%, in particular 60%, of the axial length of the tapered rollers starting from the small roller end face. Because the snap-action connection is arranged in the central region, the guiding function is implemented by the first web portions on the one hand and the holding function is realized by the second web portions on the other.

A further subject matter of the disclosure is a tapered roller bearing with a plurality of tapered rollers and the snap-action cage, as described above or according to one of the preceding claims. The tapered rollers are arranged in the windows between an inner ring and an outer ring of the tapered roller bearing. The tapered rollers can run up against the first web portions and are always arranged spaced apart in the circulating direction from and/or without contact with the second web portions.

In a preferred embodiment, the tapered roller bearing has the inner ring and the outer ring. The inner ring has an inner run-on rib for the run-on of the small roller end face of the tapered rollers and the outer ring has an outer run-on rib for the run-on of the large roller end face of the tapered rollers. It is provided that the first cage portion is arranged on the side of the inner run-on rib and the second cage portion on the side of the outer run-on rib. Preferably, the first side ring has an inner diameter that is designed to be larger than the outer diameter of the inner run-on rib. Alternatively or in addition, the second side ring has an outer diameter that is designed to be smaller than the inner diameter of the outer run-on rib.

The tapered roller bearing is particularly preferably designed as an angular roller unit (ARU). In particular, the tapered roller bearing (after installation of the snap-action cage) is designed as a unit that cannot be dismantled (non-destructively).

BRIEF DESCRIPTION OF THE DRAWINGS

Further features, advantages and effects according to the disclosure result from the following description of a preferred exemplary embodiment and the attached figures. In the figures.

DETAILED DESCRIPTION

Figure 1:
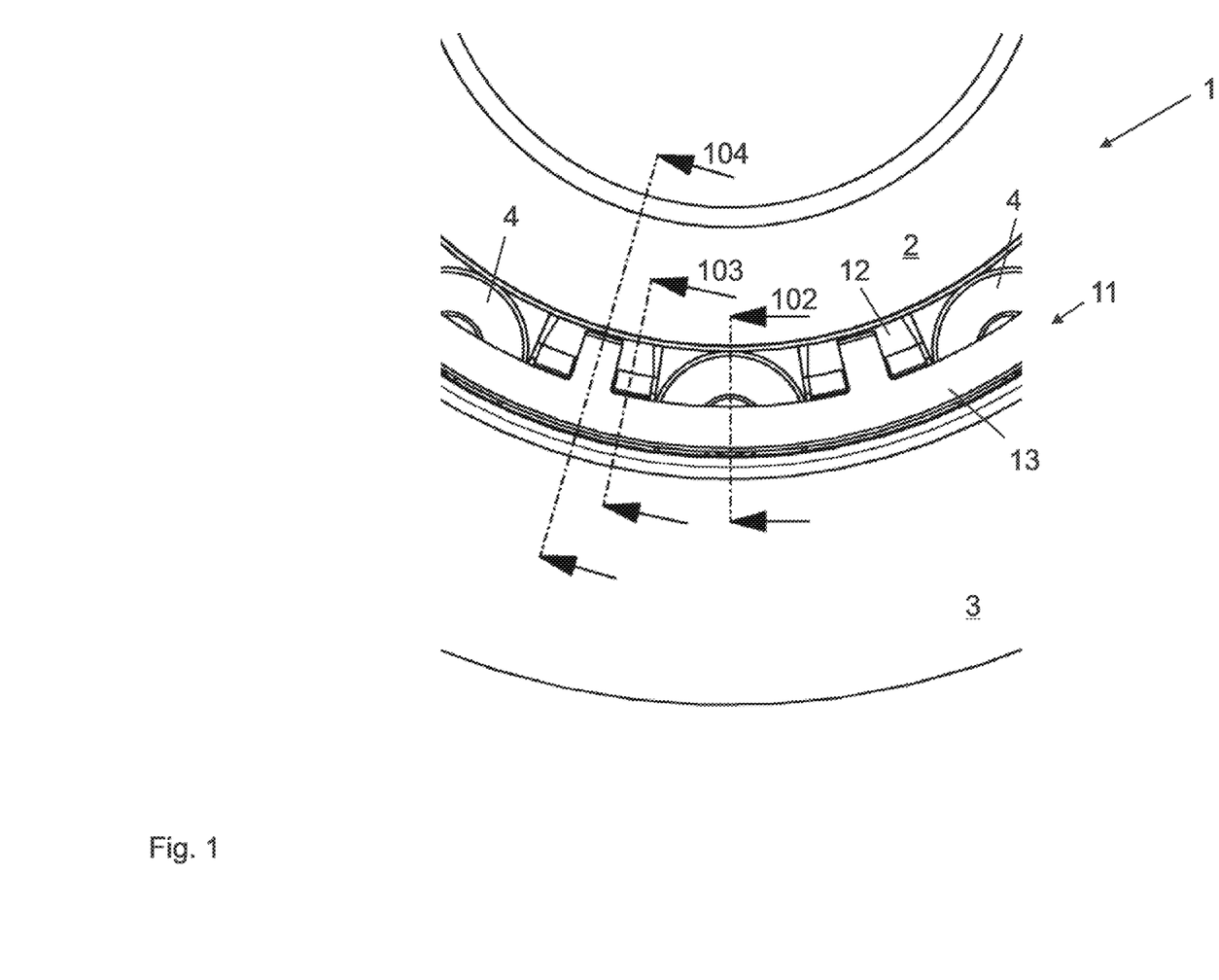
FIG. 1 shows a schematic axial top view of a tapered roller bearing as an exemplary embodiment according to the disclosure.
Figure 3:
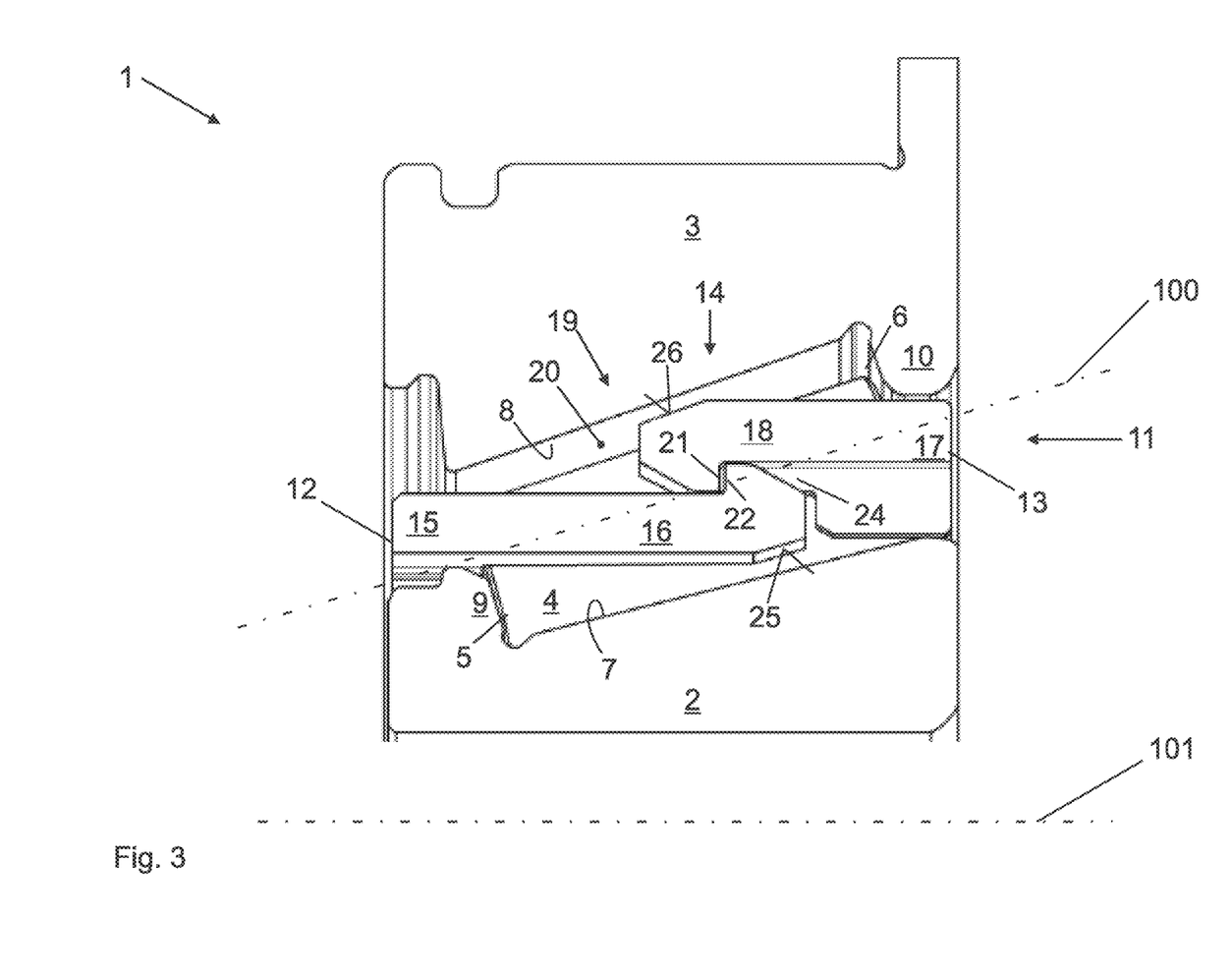
FIG. 3 shows a schematic longitudinal sectional view of the tapered roller bearing in FIG. 1 along the sectional line 103.
Figure 4:
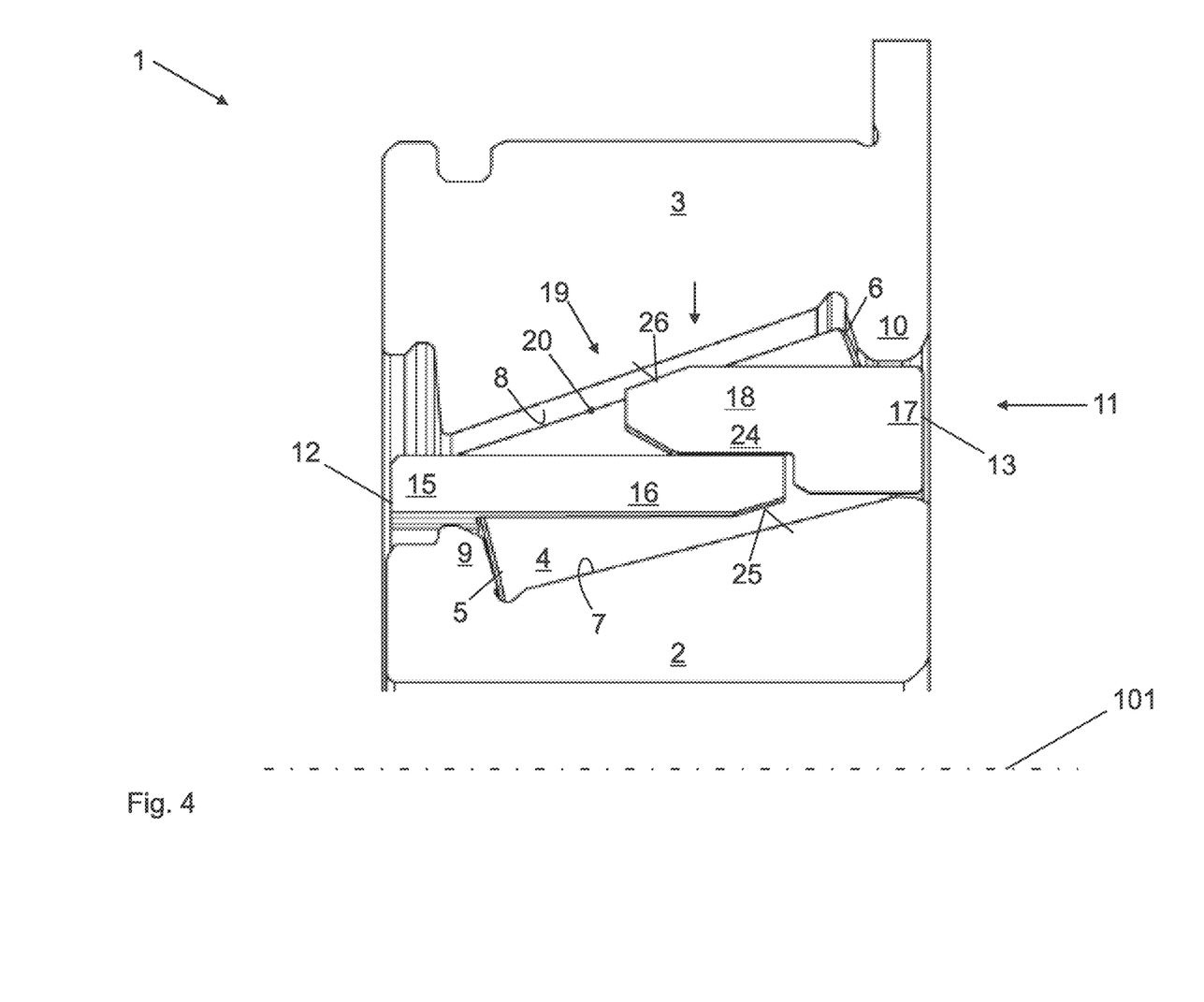
FIG. 4 shows a schematic longitudinal sectional view of the tapered roller bearing in FIG. 1 along the sectional line 104.

FIG. 1 shows a schematic axial top view of a tapered roller bearing 1 as an exemplary embodiment according to the disclosure. The tapered roller bearing 1 has an inner ring 2 and an outer ring 3 and a plurality of rolling bodies arranged to roll between the inner ring 2 and outer ring 3, which are configured as tapered rollers 4. The axial top view has three sectional planes 102, 103, 104, which are shown in FIGS. 2, 3 and 4.

Figure 2:
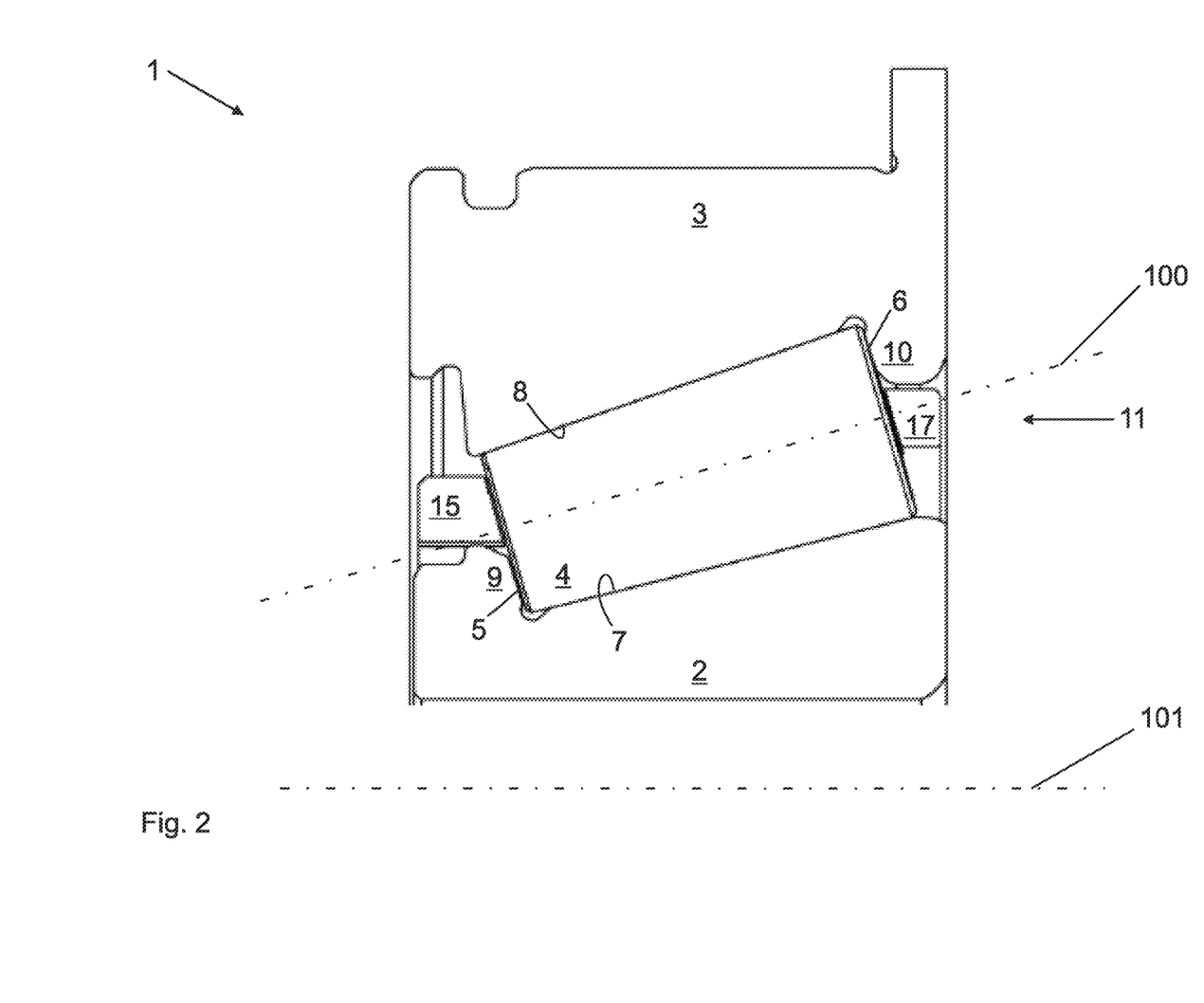
FIG. 2 shows a schematic longitudinal sectional view of the tapered roller bearing in FIG. 1 along the sectional line 102.

FIG. 2 shows a schematic longitudinal section of the tapered roller bearing 1 in the sectional plane 102, wherein the inner ring 2, the outer ring 3 and the tapered rollers 4 are again shown.

The tapered rollers 4 in each case have a rotational axis 100, wherein the rotational axis 100 assumes a taper angle relative to a main rotational axis 101 of the tapered roller bearing 1. Furthermore, the tapered rollers 4 in each case have a small roller end face 5 and a large roller end face 6, wherein the large roller end face 6 has a larger diameter than the small roller end face 5. The small roller end face 5 is arranged on a smaller pitch circle diameter than the large roller end face 6. The inner ring 2 has an inner raceway 7 and the outer ring 3 has an outer raceway 8 respectively for the tapered rollers 4. The inner raceway 7 defines an inner tapered surface, the outer raceway 8 defines an outer tapered surface.

The inner ring 2 has an inner run-on rib 9, wherein the tapered rollers 4 can run against the inner run-on rib 9 in the axial direction. Opposite the inner run-on rib 9, the other axial side on the inner ring 2 is configured to be free of ribs. The outer ring 3 has an outer run-on rib 10, wherein the tapered rollers 4 can run against the outer run-on rib 10 in the axial direction. Opposite the outer run-on rib 10, the outer ring 3 is designed to be free of ribs on the other side. It can be seen from the representation that the tapered roller bearing 1 forms a unit that cannot be dismantled, as the tapered rollers 4 cannot be pushed out in any of the axial directions.

Figure 5:
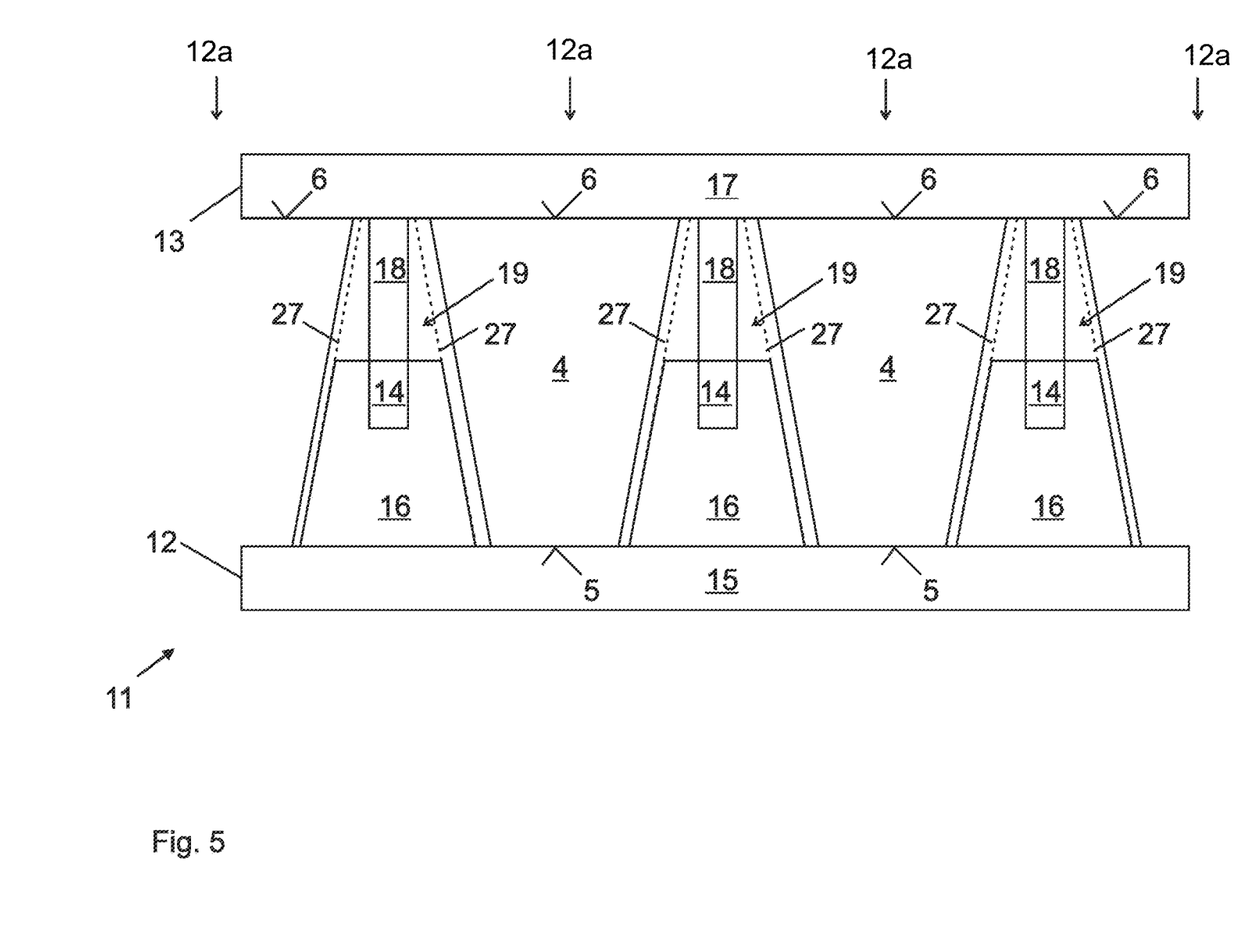
FIG. 5 shows a developed view of the tapered roller bearing of the preceding figures in a highly schematic representation.

The tapered rollers 4 are guided by a snap-action cage 11, wherein the snap-action cage 11 is designed as a window cage with a plurality of windows, wherein one of the tapered rollers 4 is arranged in each of the windows. FIG. 5 shows three of these windows in highly schematized manner.

While in FIG. 2 the sectional plane of the longitudinal sectional view runs through the center of the tapered rollers 4, in FIG. 3 the same tapered roller bearing 1 is shown in a longitudinal section with the sectional plane 103. In this representation, it can be seen that the snap-action cage 11 is formed in two pieces and consists of a first cage portion 12 and a second cage portion 13, wherein the first cage portion 12 is connected to the second cage portion 13 via a snap-action connection 14. The first cage portion 12 has a first side ring 15 and first web portions 16, wherein the first web portions 16 form a common component with the first side ring 15.

The second cage portion 13 has a second side ring 17 and second web portions 18, wherein the second web portions 18 form a common component with the second side ring 17. The first web portions 16 and the second web portions 18 jointly form one web 19 respectively, wherein the web 19 connects the side rings 15, 17 to one another. The webs 19 run inside of a rolling body chamber 20 between the tapered rollers 4.

The first web portions 16 or 18 respectively lie in their entirety on a hollow cylinder, wherein the hollow cylinder is at an angle to the tapered surface formed by the plurality of rotational axes 100. In particular, the first and/or the second web portions run parallel to the main rotational axis 101.

The snap-action connection 14 comprises a snap-action hook 21 each on the second web portions 16 and a fork hook 22 each on the first web portions 18. If the first and second cage portions 12, 13 are pushed into one another in the axial direction, the snap-action hook 21 snaps into the fork hook 22, so that the cage portions 12, 13 are connected to one another in a positively locking manner in the axial direction. The snap-action hook 21 is open radially inwards, the fork hook 22 is open radially outwards.

The snap-action connection 14 is arranged in an axial central region of the tapered rollers 4. In particular, the snap-action connection 14 is located in the rolling body chamber 20.

To further stabilize the snap-action connection 14, the first web portions 16 have inner contact surfaces 25, wherein the inner contact surfaces 25 are designed such that they contact the inner raceway 7 radially inwards when the first web portions 16 are deflected radially and are thus mechanically limited. The first contact surfaces 25 are located in their entirety on a tapered surface, wherein the tapered surface has the same main axis and the same taper angle as the tapered surface formed by the inner raceway 7.

The second web portions 18 have outer contact surfaces 26, wherein the outer contact surfaces 26 are designed to move against the outer raceway 8 if these are deflected too far radially outwards. From a constructive point of view, the entirety of the outer contact surfaces 26 defines a tapered surface, wherein the taper angle and the main axis of the tapered surface are equal to the tapered surface defined by the outer raceway 8. This allows the snap-action connection 14 to support itself in both radial directions if the loads become too great.

FIG. 4 shows a further longitudinal section, wherein the sectional plane 104 runs through the web 19 centrally between the tapered rollers 4. The first web portions 16 also have a hook groove 23 (FIG. 6), which runs between the individual hooks of the fork hook 22. The second web portions 16 have a guide portion 24 (FIG. 7), which adjoins the snap-action hook 21 centrally and at the same height. The guide portion 24 is guided in a positively locking manner by the hook groove 23 in the circulating direction via the groove walls of the hook groove 23, so that a rotation of the cage portions 12, 13 relative to one another about the main rotational axis 101 is prevented by this anti-rotation means.

FIG. 5 shows a schematic developed view of the snap-action cage 11 and the tapered rollers 4 to illustrate the special constructive design of the cage portions 12, 13. In the developed view of FIG. 5, the first cage portion 12 with the first side ring 15 and the first web portions 16 are shown again. In addition, the second cage portion 13 is shown with the second side ring 17 and the second web portions 18. It can be seen that in this schematic representation the extents of the web portions 16, 18 in the circulating direction differ significantly:

The first web portions 16 define run-on surfaces 27 for the tapered rollers 4 in the circulating direction, so that the tapered rollers 4 are guided in the windows 12a in the circulating direction. However, the run-on surfaces 27 are provided exclusively by the first web portions 16 and/or the first cage portion 12. The first web portions 16 thus assume a guiding function for the tapered rollers 4.

The run-on surfaces 27 are thus located on the first web portions 16 and can, however, be notionally extrapolated/extended, as shown by the dashed lines. The second web portions 18, on the other hand, are arranged spaced apart from and/or without contact both with the run-on surfaces 27 and the tapered rollers 4. This means that the second web portions 18 and/or the second cage portion 13 only perform a holding function for the snap-action cage 11, but no guiding function for the tapered rollers 4.

This embodiment is based on the consideration that the positioning of the snap-action connection 14 in a central region of the rolling body chamber 20 and/or the tapered rollers 4 is beneficial for the stability of the snap-action cage 11. However, and as can be seen from the schematic representation in FIG. 4, the run-on surfaces 26 run in an undercut region in relation to the second cage portion 13, so that it is not possible for the second web portions 18 to assume a guiding function for assembly reasons, as these could otherwise not be pushed in from the side of the large roller end face 6. Thus, the snap-action cage 11 actively dispenses with an implementation of the run-on surface 27 in the region of the second web portions 18.

Although in the developed view shown, the first and second web portions 16, 18 have a significantly different extent, they should nevertheless have the same cross-sectional area as a whole, so that they are designed to be equally or at least similarly stable. This is particularly advantageous at higher rotational speeds, as the first and second cage portions 12, 13 are then subjected to the same load.

Figure 6:
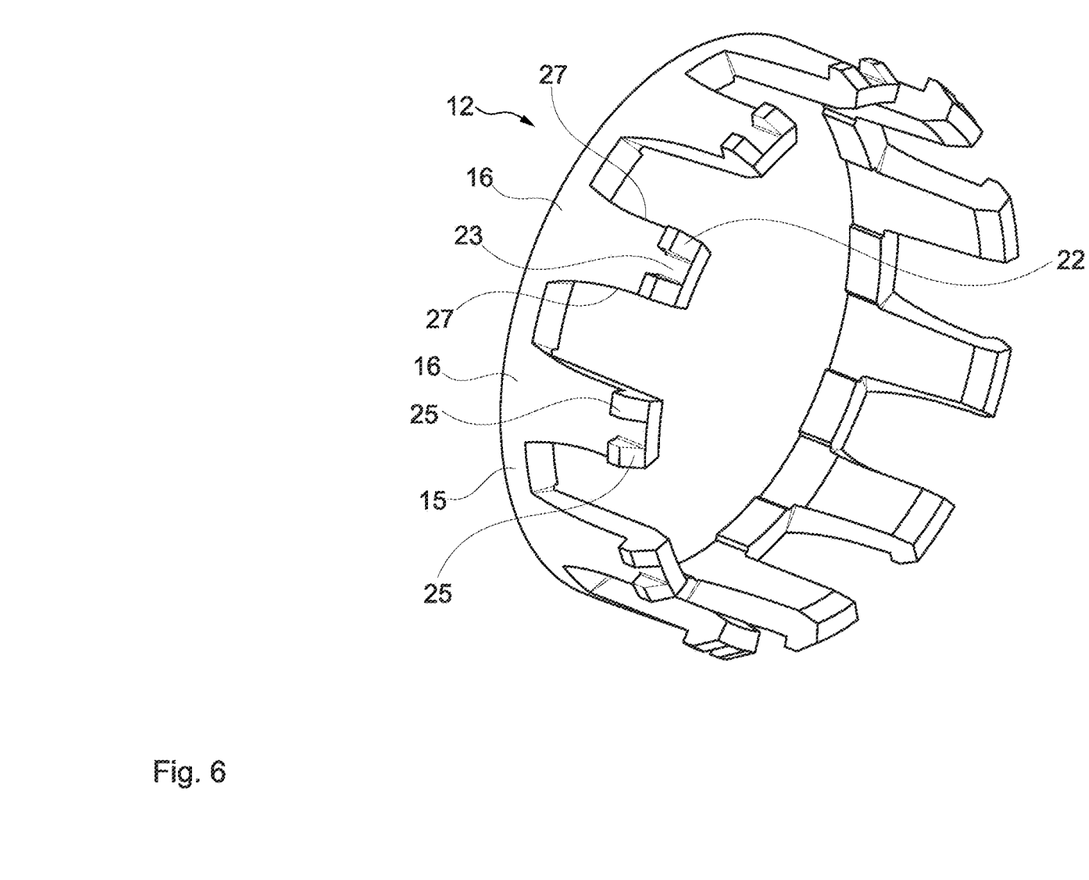
FIG. 6 shows a schematic, three-dimensional representation of a first cage portion of the snap-action cage of the tapered roller bearing in the preceding figures.

FIG. 6 shows a schematic, three-dimensional representation of the first cage portion 12, wherein the first side ring 15 and the first web portions 16 can be seen again. The run-on surfaces 27 are formed on the side edges of the first web portions 16. The first web portions 16 are tapered and thus follow the shape of the tapered rollers 4 with the shape of the run-on surfaces 27. The fork hooks 22 with the hook groove 23 arranged in between can be seen at the free end.

Figure 7:
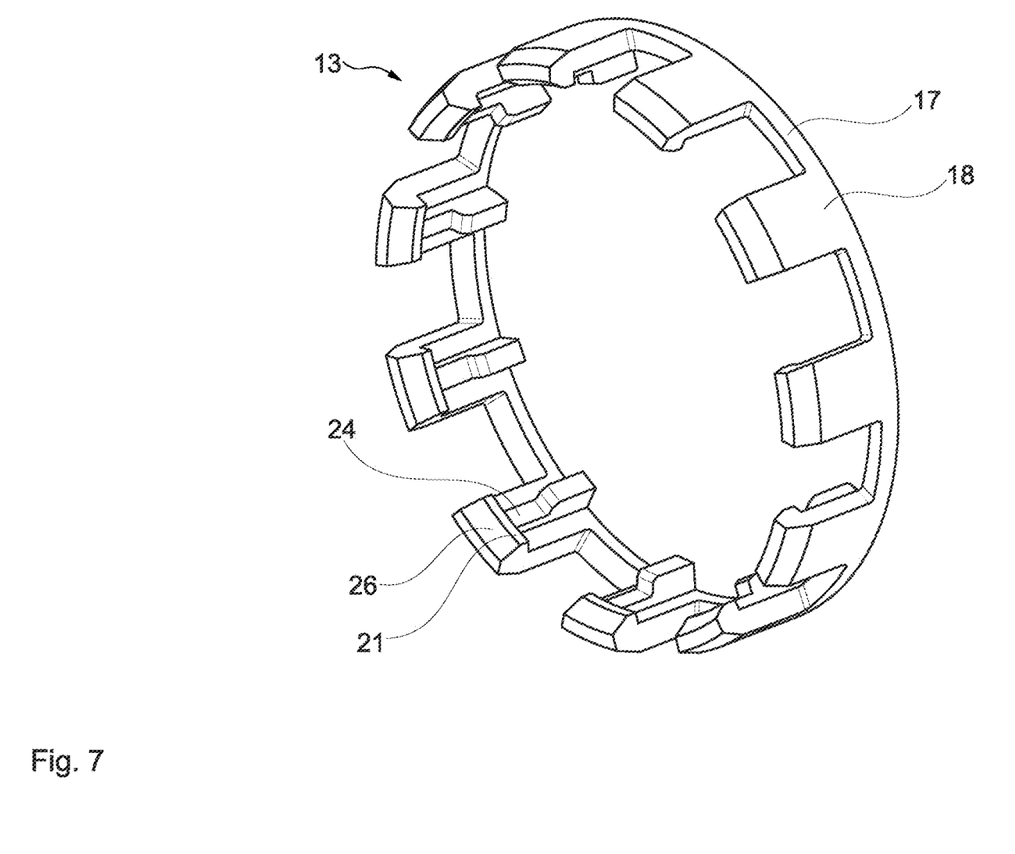
FIG. 7 shows a schematic, three-dimensional representation of a second cage portion of the snap-action cage of the tapered roller bearing in the preceding figures.

FIG. 7, on the other hand, shows a schematic, three-dimensional representation of the second cage portion 13, wherein the second side ring 17 and the second web portions 18 can be seen again. The side edges of the second web portions 18 can be of any design, as these are set back relative to the notionally extended run-on surfaces 27 and/or are designed to be without contact with the tapered rollers 4. It can be seen that the snap-action hook 21 extends over the full width in the circulating direction of the second side portions 18. The guide portion 24, designed as a web, adjoins the snap-action hook 21 centrally. A raised web is arranged in the further extension of the guide portion 24, which forms an axial stop for the first cage portion 12.

Figure 8:
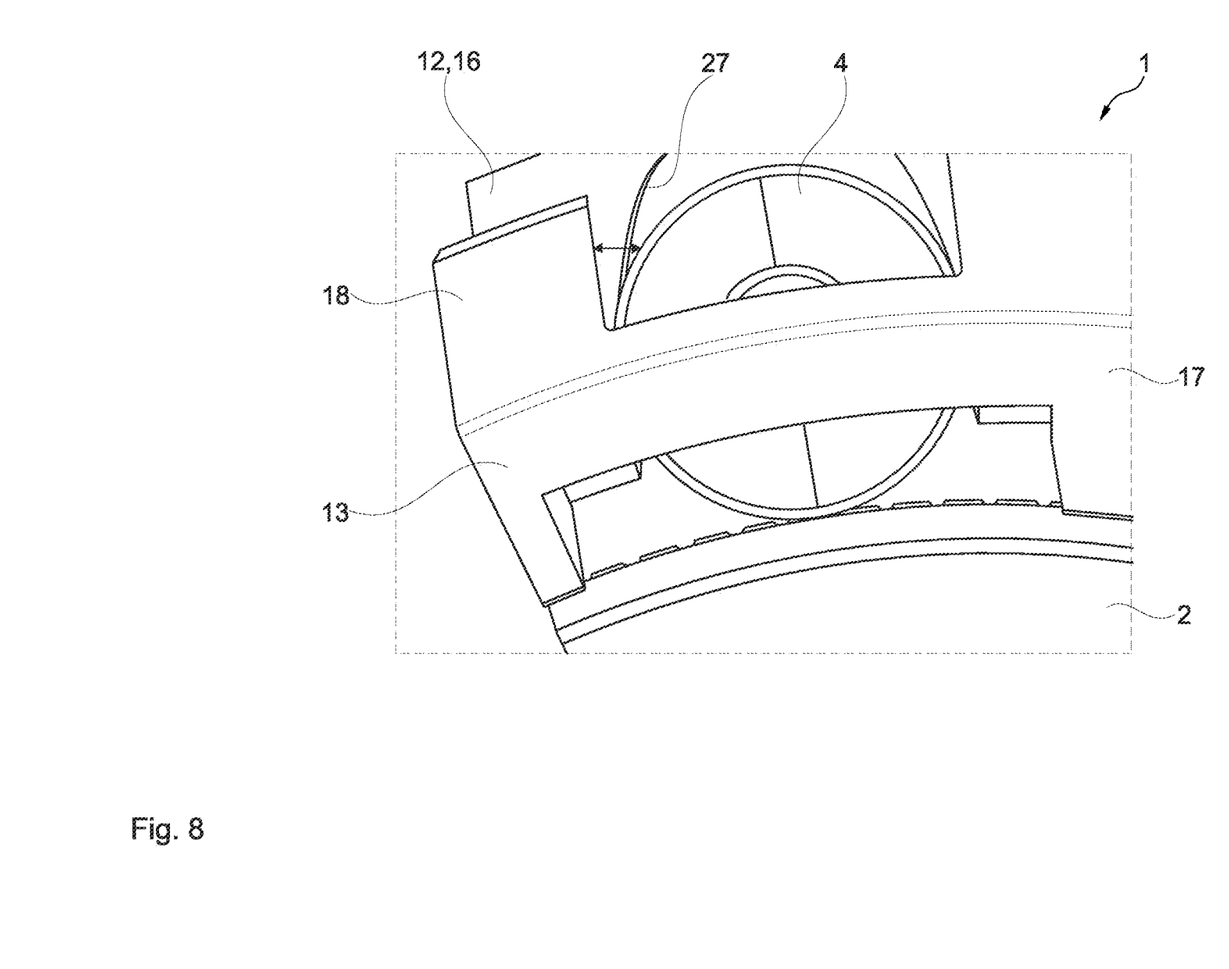
FIG. 8 shows a schematic, three-dimensional top view of the tapered roller bearing to illustrate the different functions of the cage portions.

FIG. 8 shows an oblique top view of a three-dimensional representation of the tapered roller bearing 1 with the outer ring 3 visually suppressed. In this representation, it can be seen that the first web portions 16 nestle against the tapered rollers 4 with the run-on surfaces 27. The side edges of the second web portions 18, on the other hand, are clearly spaced apart from the tapered rollers 4. FIG. 8 thus clearly shows the functional separation between the guiding function and the holding function.

The solution to the problem described here is that the snap-action cage 11 consists of two cage halves and the connection/snapping of the two parts occurs in the center region of the tapered roller bearing 1. The distinct feature of this solution is that one cage half (mounted on the small roller end face 5), designed as the first cage portion 12, assumes the guiding function of the rolling bodies, while the other cage half (mounted on the large roller end face 6), designed as the second cage portion 13, assumes the holding function of the snap-action cage 11.

An undercut can thus be avoided. This results in a cage solution that, on the one hand, allows for good roller guidance of the tapered rolling body, but on the other hand can no longer fall out. In this regard, the first cage portion 12 assumes the roller guidance. The second cage portion 13 acts as a cover part, without direct contact to the tapered roller 4. All webs 19 per cage part are designed to be identical at the circumference, which facilitates assembly. The cage parts are secured against rotation in relation to one another in the center of the web. During design/construction, it should be ensured that the cross-sections of the two cage parts are as similar as possible/identical. This ensures that the two parts exhibit a similar stiffness, thus ensuring that the radial expansion (behavior when bent open) occurs to a similar extent at high speed and the radial overlap in the connecting region does not change too much, as both perform the same movements at the long ends. In this regard, radial limitation by the outer ring raceway is both possible and sensible.

LIST OF REFERENCE SYMBOLS

1 Tapered roller bearing
2 Inner ring
3 Outer ring
4 Tapered rollers
5 Small roller end face
6 Large roller end face
7 Inner raceway
8 Outer raceway
9 Inner run-on rib
10 Outer run-on rib
11 Snap-action cage
12 First cage portion
12a Windows
13 Second cage portion
14 Snap-action connection
15 First side ring
16 First web portions
17 Second side ring
18 Second web portions
19 Web
20 Rolling body chamber
21 Snap-action hook
22 Fork hook 23 Hook groove
24 Guide portion
25 Inner contact surfaces
26 Outer contact surfaces
27 Run-on surfaces
100 Rotational axis
101 Main rotational axis
102 Sectional plane of FIG. 2
103 Sectional plane of FIG. 3
104 Sectional plane of FIG. 4

The invention claimed is:

1. A snap-action cage for a tapered roller bearing,
the snap-action cage is configured as a window cage with a plurality of windows for receiving tapered rollers and comprises:
a first cage portion having a plurality of first web portions that in each case define run-on surfaces for the tapered rollers;
a second cage portion having a plurality of second web portions that are connectable and/or are connected to the first web portions via a snap-action connection, in order to form in each case one web, and the second web portions are configured spaced apart in a circulating direction from and/or without contact with the run-on surfaces;
the snap-action connection includes a hook receptacle having a fork hook with a hook groove configured in between on one of the first cage portion or the second cage portion, and a snap-action hook that snaps into the fork hook on the other of the first cage portion or the second cage portion, and a guide portion on the snap-action hook is held in the hook groove in a positively locking manner in the circulating direction.

2. The snap-action cage according to claim 1, wherein the second web portions are configured without undercuts in relation to the run-on surfaces.

3. The snap-action cage according to claim 1, wherein at least one of the first or the second web portions extend in an axial direction.

4. The snap-action cage according to claim 1, wherein the snap-action connection is connected in a positively locking manner in the circulating direction, so that the first cage portion and the second cage portion are secured against rotation.

5. The snap-action cage according to claim 1, wherein the snap-action connection has the snap-action hook on the web portions of the one of the first or second cage portions and the hook receptacle on the other one of the first or the second cage portions.

6. The snap-action cage according to claim 1, wherein the first cage portion has a first side ring and the second cage portion has a second side ring, the first and second side rings are connected to one another via the webs, and the first and the second web portions and/or the side rings are dimensioned such that a rigidity of the web portions is similar.

7. The snap-action cage according to claim 1, wherein the snap-action connection is arranged in an axial direction in a central region between the cage portions.

8. A tapered roller bearing, comprising:
a plurality of tapered rollers; and
the snap-action cage according to claim 1, wherein the tapered rollers are arranged in the windows;
wherein the tapered rollers are adapted to run up against the first web portions and are arranged at least one of spaced apart in the circulating direction from or without contact with the second web portions.

9. The tapered roller bearing according to claim 8, further comprising an inner ring and an outer ring, the inner ring has an inner run-on rib for run-on of a small roller end face of the tapered rollers and the outer ring has an outer run-on rib for run-on of a larger roller end face of the tapered rollers, and the first cage portion is arranged on a side of the inner run-on rib and the second cage portion is arranged on a side of the outer run-on rib.

10. A snap-action cage for a tapered roller bearing, comprising:
a first cage portion having a plurality of first web portions that in each case define run-on surfaces for the tapered rollers;
a second cage portion having a plurality of second web portions that are connectable and/or are connected to the first web portions via a snap-action connection, in order to form in each case one web, and the second web portions are configured at least one of spaced apart in a circulating direction from or without contact with the run-on surfaces, the webs define a plurality of windows for receiving tapered rollers;
the snap-action connection includes a hook receptacle having a fork hook with a hook groove on one of the first cage portion or the second cage portion, and a snap-action hook that snaps into the fork hook on the other of the first cage portion or the second cage portion, and a guide portion on the snap-action hook is held in the hook groove in a positively locking manner in the circulating direction.

11. The snap-action cage according to claim 10, wherein the second web portions are configured without undercuts in relation to the run-on surfaces.

12. The snap-action cage according to claim 10, wherein at least one of the first or the second web portions extend in an axial direction.

13. The snap-action cage according to claim 10, wherein the snap-action connection is connected in a positively locking manner in the circulating direction, so that the first cage portion and the second cage portion are secured against rotation.

14. The snap-action cage according to claim 10, wherein the snap-action connection has a respective one of the snap-action hooks on each of the web portions of the one of the first or second cage portions and a respective one of the hook receptacles on each of the other one of the first or the second cage portions.

15. The snap-action cage according to claim 10, wherein the first cage portion has a first side ring and the second cage portion has a second side ring, the first and second side rings are connected to one another via the webs, and the first and the second web portions and/or the side rings are dimensioned such that a rigidity of the web portions is similar.

16. The snap-action cage according to claim 10, wherein the snap-action connection is arranged in an axial direction in a central region between the cage portions.

* * * * *